United States Patent [19]

Satake

[11] Patent Number: 5,103,350
[45] Date of Patent: Apr. 7, 1992

[54] APPARATUS FOR INSPECTING A SIGNAL-RECORDED VIDEOTAPE

[75] Inventor: Kenji Satake, Kyoto, Japan

[73] Assignee: Jyonan Denki Kogyosho, Co., Ltd., Kyoto, Japan

[21] Appl. No.: 472,312

[22] Filed: Jan. 30, 1990

[30] Foreign Application Priority Data

Apr. 7, 1989 [JP] Japan .................................. 1-173242

[51] Int. Cl.⁵ .............................................. G11B 27/36
[52] U.S. Cl. ..................................................... 360/31
[58] Field of Search ................... 360/31; 324/212, 213; 358/131

[56] References Cited

U.S. PATENT DOCUMENTS 4,746,991  5/1988  Efron et al. ............................ 360/31

Primary Examiner—Aristotelis Psitos
Assistant Examiner—Varsha V. Sheladia
Attorney, Agent, or Firm—Koda and Androlia

[57] ABSTRACT

An apparatus for automatically sorting out a defectively signal-recorded cassette videotape. A series of video signals recorded on the videotape by means of frequency modulation is amplitude-detected to obtain a normally constant DC output. If the DC output, which is compared with a predetermined reference voltage by a comparator, shows a voltage drop deeper than a value defined by the above predetermined reference voltage for a predetermined period of time, the video signals are judged to be recorded defectively, and the cassette videotape is discharged from the apparatus. As to sound signals also, if they are recorded in the form of frequency modulation for Hi-Fi recording, defective recording of the sound signals is judged in a manner similar to the above. However, if sound signals are recorded as they are without being modulated, the audio frequency sound signals is converted to pulse signals by a Schmitt circuit whose trigger level is set at a level corresponding to an audible minimum amplitude of the sound signals. With the Schmitt circuit thus adjusted, if the pulse signals outputted from the circuit pauses for a predetermined period of time, the sound signals are judged to be defectively recorded, and the cassette videotape is discharged from the apparatus.

9 Claims, 2 Drawing Sheets

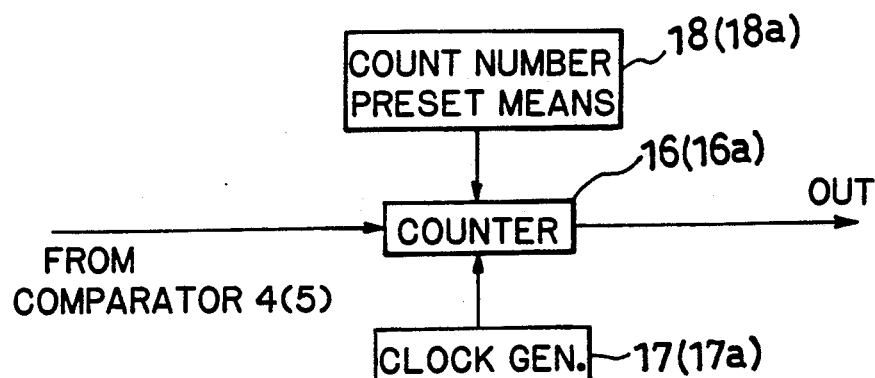
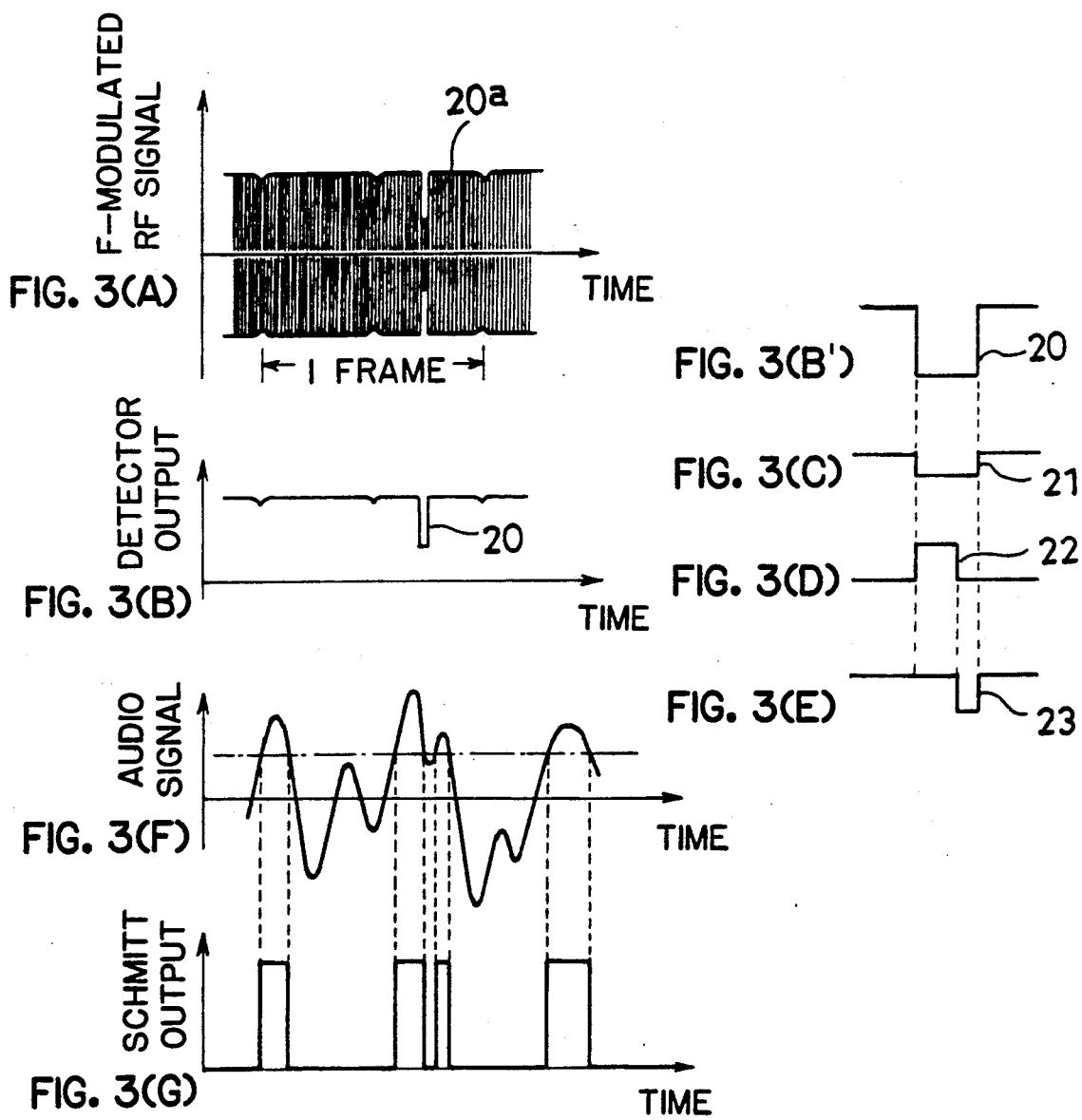

APPARATUS FOR INSPECTING A SIGNAL-RECORDED VIDEOTAPE

BACKGROUND OF THE INVENTION

The present invention relates to an apparatus for inspecting the state of signal recording of a videotape on which are recorded image and sound signals.

Conventionally, the signal recording state of a videotape on which image and sound signals are recorded has been inspected by the eye and ear with the recorded image and sound signals reproduced as visible images and audible sounds on a television set through a videotape playback system. In this method, if any defect is found in the reproduced images or sounds, a person in charge of inspection manually stops the running of the videotape and rejects the tape as a defective videotape.

Such a conventional human method of vidiotape inspection disadvantageously ties a person in charge of inspection down to a nerves exhausting job either until any defect is found in the image and/or sounds being observed or until the videotape under inspection comes to the end without any defect discovered. A further disadvantage of the conventional method is that the criterion of judging a defect to be acceptable or unacceptable can not help being somewhat arbitrary because the judgement is entrusted to a person in charge of inspection. In addition, so long as the inspection is made by a person, it is a decisive disadvantage that an unacceptable defect may occasionally be overlooked.

OBJECTS AND SUMMARY OF THE INVENTION

Accordingly, the present invention aims at eliminating the disadvantages involved in the conventional method of inspecting a signal-recorded videotape, and makes it an object to provide an apparatus for automatically inspecting the state of signal recording of a signal-recorded videotape under a predetermined criterion.

Another object of the present invention is to constitute such an apparatus so as to be combined, if necessary, with a videotape conveyor system for the purpose of automatically inspecting a plurality of signal-recorded videotapes in succession.

Incidentally, on a signal-recorded videotape there are recorded a series of image signals in the form of a high frequency signal frequency-modulated with image signals, a series of sound signals either in the form of audio signals or in the form of a high frequency signal frequency-modulated with sound signals, and a series of tape speed control pulse signals.

Therefore, to achieve the above objects the apparatus according to the present invention consists essentially of a defective image signal detecting means, a defective sound signal detecting means, a defective tape-speed control signal detecting means, and a tape end detecting means.

The defective image signal detecting means is to detect whether or not the high frequency signal frequency-modulated with image signals has its normally constant amplitude made to fall down below a predetermined level for a predetermined period of time. Once such a level drop is detected in the amplitude, the image signals are judged to be defectively recorded, and a defective image signal detection signal is outputted to stop and reject the videotape under inspection as a defectively signal-recorded videotape.

The defective sound signal detecting means is constituted in two ways. For sound signals recorded in the form of a high frequency signal frequency-modulated with the sound signals, the defective sound signal detecting means is devised so as to function substantially in the same manner as in the case of the defective image signal detecting means, and therefore, a defect of the sound signals is also detected as a similar level drop of the amplitude of the sound signal carrying high frequency signal. For sound signals recorded as audio signals, on the other hand, the defective sound signal detecting means detect whether or not the audio signals remain below a predetermined low level for a predetermined period of time. If the audio signals continues to be lower than such a low level for such a period of time, the sound signals are judged to be defectively recorded, and a defective sound signal detection signal is outputted to stop and reject the videotape under inspection as a defectively signal-recorded videotape.

The defective tape speed control signal detecting means detects whether or not a tape speed control pulse signal is omitted during the continuation of image signal output. If, though the image signal is being outputted, the omission of a tape speed control pulse is detected, a defective tape speed control signal detection signal is outputted to stop and reject the videotape under inspection as a defectively signal-recorded videotape.

The tape end detecting means detects the disappearance of both tape speed control signals and image signals, and outputs a tape end detection signal to stop and reject, as a properly signal-recorded videotape, the videotape having so far been inspected.

BRIEF DESCRIPTION OF THE DRAWINGS

In the following the present invention is described in further detail on reference to the accompanying drawings, in which:

FIG. 2 shows a block-diagrammatical partial constitution illustrating another embodiment of the present invention; and FIGS. 3A-3G and 3(B') shows various signal wave forms illustrating the function of the present invention.

DETAILED DESCRIPTION OF THE INVENTION

Figure 1:
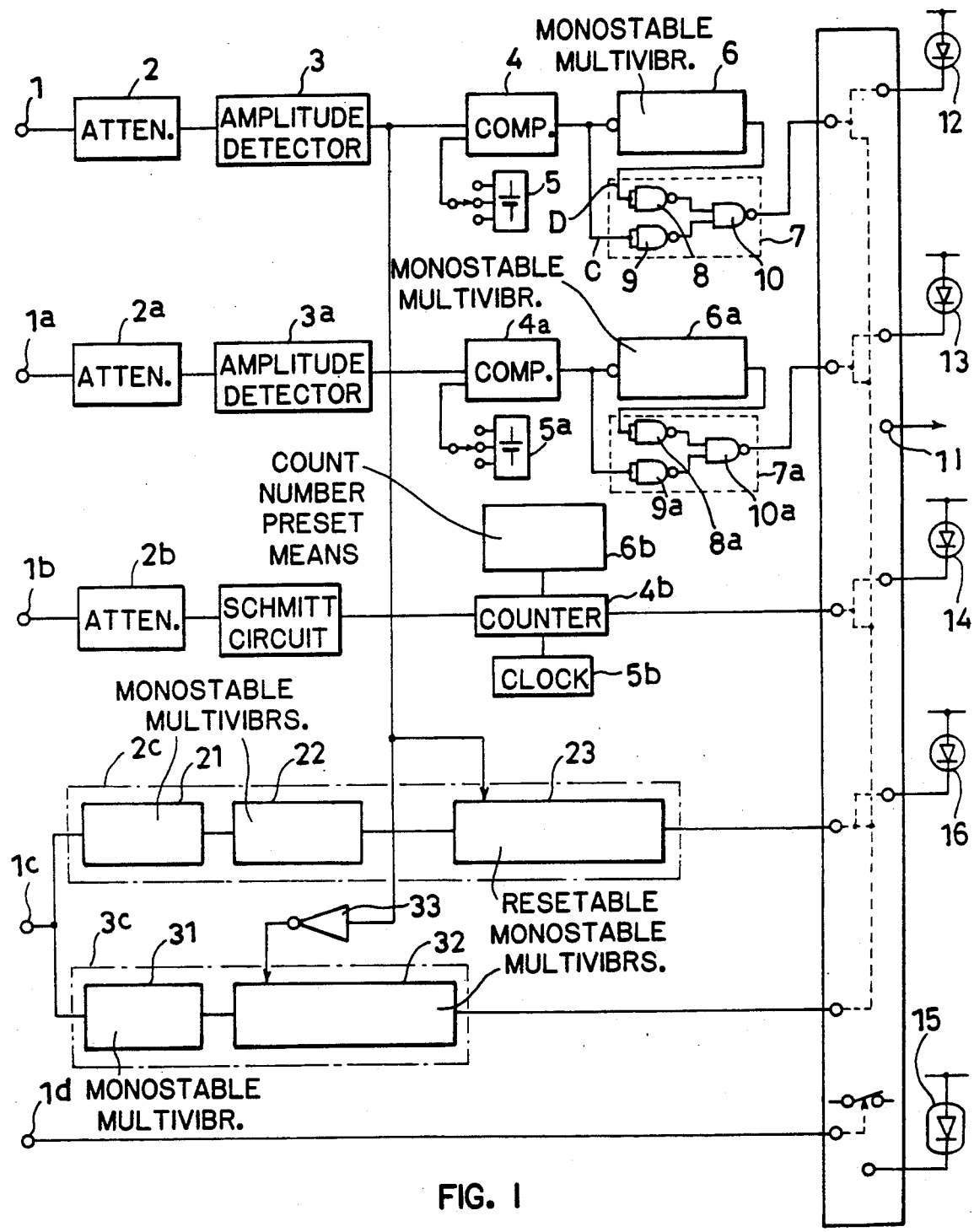
FIG. 1 shows an block-diagrammatical constitution of an embodiment of the present invention.

Referring to FIG. 1, which shows the constitution of an embodiment of the present invention, a series of image signals outputted from an image signal pick-up head (not shown) is inputted to a terminal 1 in the form of a high frequency signal frequency-modulated with image signals. Such a frequency-modulated high frequency signal, which is shown in FIG. 3(A) for the case where the signal contains a defect 20a, is level-adjusted at an attenuator 2 and then rectified by an amplitude detector 3 to output DC voltage as shown in FIG. 3(B). The The amplitude detector 3, whose DC output should normally be substantially constant, has its output made accompanied by a level drop 20 in correspondence with the defect 20a in the high frequency signal. The output from the amplitude detector 3 is compared at a comparator 4 with a predetermined reference voltage supplied from a reference voltage source 5. If the level drop 20 is deeper than a level given by the above predetermined reference voltage, the comparator 4 has its output level turned down outputting a downward pulse 21 (shown in FIG. 3(C)) having a time width equal to that of the level drop 20 (reproduced in FIG. 3(B') with the illustration width enlarged in comparison with FIG. 3(B)). With the fall-down edge of the downward pulse 21 outputted from the comparator 4, a monostable multivibrator 6 outputs a upward pulse 22 (shown in FIG. 3(D)) having a predetermined time width. The pulses 21 and 22 are inputted, respectively through lines C and D, to a composite logic circuit 7 consisting of three NAND circuits 8, 9 and 10 as wired as is shown in FIG. 1. The function of the composite logic circuit 7 can be summarized as given in a table shown below:

| Input line C | Input line D | Output line E |
|---|---|---|
| L | L | L |
| L | H | H |
| H | L | H |
| H | H | H |

As is easily understood from the above table and the wave forms shown in FIG. 3(C) and FIG. 3(D), when the pulse 21 is wider than the pulse 22, the composite logic circuit 7 outputs a downward pulse 23 as shown in FIG. 3(E). This pulse signal 23 is taken out from an output terminal 11 as a defective image signal detection signal, and used to stop and reject the videotape under inspection as a defectively signal-recorded tape.

As to sound signals, if the signals are given in the form of a high frequency signal frequency-modulated with a series of audio frequency sound signals, the frequency-modulated high frequency signal outputted from a sound signal pick-up coil (not shown) is inputted to a terminal 1a and treated with a series of the same circuits as are employed in the above described process of image signal treatment. All the corresponding constituents following the terminal 1a are indicated by the same reference numbers (with a distinguishing sign "a" affixed) as is used in the circuit group following the terminal 1. Futher, the description of signal treatment is omitted as to the present sound signals frequency-modulating a high frequency signal, since the function of each constituent is, in principle, the same as in the case of the above image signal treatment. Also in this case the output pulse from the composit logic circuit 7a is taken out from the output terminal 11, but as a defective sound signal detection signal, and used to stop and reject the videotape under inspection as a defectively signal-recorded videotape.

If, in contrast with the above, the sound signals are recorded in the form of a series of audio sound signals, the sound signals are inputted to a terminal 1b, gain-adjusted by an attenuator 2b and then transferred to a pulse forming circuit 3b. The pulse forming circuit 3b, which may be constituted as a Schmidt circuit, generates pulse signals in correspondence with a predetermined level over which the sound signals swing. The pulse signals are illustrated in FIG. 3(G) in comparison with the audio sound signals shown in FIG. 3(F). The rise-up and the fall-down edges of each of the pulse signals outputted from the Schmidt circuit respectively resets and sets a counter 4b, which counts clock pulses supplied from a clock generator 5b. The counter 4b is devised so as to output a pulse signal as a defective sound signal detection signal after counting out a predetermined number of the clock pulses, the number being set by a counting number setting means 6b. Therefore, if the counter 4b, which was made to start counting by a pulse from the Schmidt circuit, can complete counting the above predetermined number of clock pulses with the counting not interrupted halfway by being reset by the next pulse from the Schmidt circuit, namely, if two successive pulse s outputted from the Schmidt circuit have between them a time interval longer than the period needed for the counter 4b to count out the predetermined number of clock pulses, the sound signals are judged to be defectively recorded and the counter 4b outputs the above defective sound signal detection signal, which is taken out from the output terminal 11 and used to stop and reject the videotape under inspection as a defectively signal-recorded tape.

Finally, tape speed control signals taken out by a control signal pick-up head (not shown) is inputted to an input terminal 1c. The tape speed control signals, which consist of a series of pulse signals with a period of 33.3 msec, are then led to both a tape speed control signal defect detecting circuit 2c and a tape end detecting circuit 3c. The tape speed control signal defect detecting circuit 2c consists essentially of two monostable multivibrator 21 and 22, and a resettable monostable multivibrator 23; the multivibrator 21 generates a pulse having a width, for instance, of 47 msec which is larger than the period 33.3 msec of the tape speed control pulse signals and smaller than twice the period; the multivibrator 22 generates a pulse having a width, for instance, of 220 msec; and the resettable multivibrator 23, which finally outputs a tape speed control signal defect detection signal, has its reset signal input terminal connected to the output of the amplitude detector 3. On the other hand, the tape end detecting circuit 3c consists essentially of a monostable multivibrator 31 and a resettable monostable multivibrator 32; the multivibrator 31 generates a pulse having a width, for instance, of 267 msec; and the resettable multivibrator 32, which outputs a tape end detection signal, has its reset signal input terminal connected through an inverter 33 to the output of the amplitude detector 3.

In the tape speed control signal defect detecting circuit 2c, normally the multivibrator 21 can not complete generation of the above mentioned 47-msec pulse but has its output kept continuously at a constant level, becacuse it is continually set up by the tape speed control pulses successively inputted thereto at a time interval of 33.3 msec, causing the succeeding multivibrators 22 and 23 not to be set up. However, if the series of tape speed control pulse signals has an omission of one pulse, the multivibrator 21 set up by the pulse just before the missing pulse generates one 47-msec pulse. Then the end edge of this pulse sets up the multivibrator 22 to make it output such a 220-msec pulse as mentioned previously. On the other hand, the resettable multivibrator 23 is expected to be made active with its reset signal input terminal supplied with a substantially constant DC voltage outputted from the amplitude detector 3. Therefore, the end edge of the pulse (220 msec) outputted from the multivibrator 22 can set up the multivibrator 23 to make it generate a tape speed control signal defect detection signal. This signal is taken out from the output terminal 11 and used to stop and reject the videotape under inspection as a defectively singnal-recorded tape.

In the tape end detecting circuit 3c, the multivibrator 31 normally has its output kept at a constant level for the same reason as in the case of the multivibrator 21. However, if the multivibrator 31 is set up by the final tape speed control pulse recorded in the end portion of the videotape, it generate such a 267-msec pulse as mentioned previously. In this case the resettable multivibrator 32 is expected to be made active with its reset signal input terminal kept at a high level by an output from the inverter 33 whose input is kept at a low level because of vanishing of the output from the amplitude detector 3. Thus the end edge of the 267-msec pulse outputted from the multivibrator 31 sets up the resettable multivibrator 32 to make it generate a tape end detection signal. This signal is takenout from the output terminal 11 and used to stop and push out, as a normally signal-recorded tape, the videotape having so far been inspected.

Further, the present invention can be embodied also by modifying, as shown in FIG. 2, the two similar circuit groups respectively related to the monostable multivibrators 6 and 6a. As is shown in FIG. 2, the modification consists essentially of a counter 16 (16a), a clock generator 17 (17a) and a count number preset means 18 (18a). The output from the preceeding comarator 4 (4a) is inputted to the counter 16 (16a) to make it set up by the fall-down edge of the downward pulse 21 (shown in FIG. 3(C)) outputted from the comparator 4 (4a). With the pulse 21 inputted, the counter 16 (16a) starts counting a predetermined number of clock pulses supplied from the clock generator 17 (17a), the predetermined number being inputted to the counter 16 (16a) in advance by the count number preset means 18 (18a). If the counter 16 (16a) can complete counting the predetermined number of clock pulses without being reset halfway by the rise-up edge of the downward pulse 21, namely, if the period needed for the counter to count out the above predetermined number is larger than the time width of the pulse 21, that is, of the level drop 20, the counter 16 (16a) outputs an image signal defect detection signal (or a sound signal defect detection signal). In this embodiment, the period needed for the comparator 16 (16a) corresponds to the width of the pulse outputted from the multivibrator 6 (6a).

Needless to say, the present invention can be embodied by eliminating either the circuit series following the input terminal 1a or that following the input terminal 1b.

The present invention, if combined with a purposefully designed conveyor system, make it possible to automatically inspect a plurality of signal-recorded videotapes successively. In such a case the above mentioned various signals taken out from the output terminal 11 are used also to control the operation of the conveyor system.

I claim:

1. An apparatus for inspecting a signal-recorded videotape, comprising: means for providing first and second predetermined reference voltage a first amplitude detector for detecting an amplitude of a high frequency signal frequency-modulated with a series of image signals;

a first signal level comparing means for comparing an output from the first amplitude detector with a first predetermined reference voltage;

a first signal duration comparing means for comparing duration of an output from of the first signal level comparing means with a first predetermined period of time, the first signal duration comparing means outputting a first signal defect detection signal for stopping and rejecting a signal-recorded videotape under inspection when the duration of the output from the first signal level comparing means is not shorter than the first predetermined period of time;

a second amplitude detector for detecting an amplitude of a high frequency signal frequency-modulated with a series of sound signals;

a second signal level comparing means for comparing an output from the second amplitude detector with a second predetermined reference voltage;

a second signal duration comparing means for comparing duration of an output from of the second signal level comparing means with a second predetermined period of time, the second signal duration comparing means outputting a second signal defect detection signal for stopping and rejecting a signal-recorded videotape under inspection when the duration of the output from the second signal level comparing means is not shorter than the second predetermined period of time;

a Schmitt circuit for generating pulse signals according to a series of audio frequency sound signals inputted thereto;

a period comparing means for comparing time intervals of the pulse signals outputted form the Schmitt circuit with a third predetermined period of time, the period comparing means outputting a signal equivalent to the second signal defect detection signal when a time invterval between two successive pulse signals outputted from the Schmitt circuit is not shorter than the third predetermined period of time;

a first monostable multivibrator for generating, triggered by a series of tape speed control pulse signals, a pulse having a width larger than a constant time interval of the tape speed control pulse signals and smaller than twice the constant time interval;

a second monostable multivibrator for generating, triggered by the end edge of a pulse outputted from the first monostable multivibrator, a predetermined pulse;

a first resettable monostable multivibrator having its reset singnal input terminal supplied with a signal from the first amplitude detector so as to be kept operational only when the first amplitude detector continues outputting an amplitude signal, the first resettable monostable mutivibrator generating, triggered by the end edge of a pulse outputted from the second monostable multivibrator, a third signal defect detection signal for stopping and rejecting a signal-recorded videotape under inspection;

a third monostable multivibrator for generating, triggered by a series of tape speed control pulse signals, a predetermined pulse; and a second resettable monostable multivibrator having its reset signal input terminal supplied with a signal from the first amplitude detector so as to be kept operational only when the first amplitude detector continues outputting no amplitude signal in substance, the second resettable monostable multivibrator generating, triggered by the end edge of a pulse outputted from the third monostable multivibrator, a tape end detection signal for stopping and rejecting a signal-recorded videotape under inspection.

2. An apparatus for inspecting a signal-recorded videotape, comprising: means for providing first and second predetermined reference voltage a first amplitude detector for detecting an amplitude of a high frequency signal frequency-modulated with a series of image signals;

a first signal level comparing means for comparing an output from the first amplitude detector with a first predetermined reference voltage;

a first signal duration comparing means for comparing duration of an output from of the first signal level comparing means with a first predetermined period of time, the first signal duration comparing means outputting a first signal defect detection signal for stopping and rejecting a signal-recorded videotape under inspection when the duration of the output from the first signal level comparing means is not shorter than the first predetermined period of time;

a second amplitude detector for detecting an amplitude of a high frequency signal frequency-modulated with a series of sound signals;

a second signal level comparing means for comparing an output from the second amplitude detector with a second predetermined reference voltage;

a second signal duration comparing means for comparing duration of an output from of the second signal level comparing means with a second predetermined period of time, the second signal duration comparing means outputting a second signal defect detection signal for stopping and rejecting a signal-recorded videotape under inspection when the duration of the output from the second signal level comparing means is not shorter than the second predetermined period of time;

a first momostable multivibrator for generating, triggered by a series of tape speed control pulse signals, a pulse having a width larger than a constant time interval of the tape speed control pulse signals and smaller than twice the constant time interval;

a second monostable multivibrator for generating, triggered by the end edge of a pulse outputted from the first monostable multivibrator, a predetermined pulse;

a first resettable monostable multivibrator having its reset signal input terminal supplied with a signal from the first amplitude detector so as to be kept operational only when the first amplitude detector continues outputting an amplitude signal, the first resettable monostable multivibrator generating, triggered by the end edge of a pulse outputted from the second monostable multivibrator, a third signal defect detection signal for stopping and rejecting a signal-recorded videotape under inspection;

a third monostable multivibrator for generating, triggered by a series of tape speed control pulse signals, a predetermined pulse; and a second resettable monostable multivibrator having its reset signal input terminal supplied with a signal from the first amplitude detector so as to be kept operational only when the first amplitude detector continues outputting no amplitude signal in substance, the second resettable monostable multivibrator generating, triggered by the end edge of a pulse outputted from the third monostable multivibrator, a tape end detection signal for stopping and rejecting a signal-recorded videotape under inspection.

3. An apparatus as defined in Claim 1 or 2, wherein at least either of the first and the second signal duration comparing means consists essentially of a combination of a monostable multivibrator with an OR circuit.

4. An apparatus as defined in Claim 1 or 2, wherein at least either of the first and the second signal duration comparing means consists essentially of a counter, a clock oscillator and a count number setting means; the count number setting means determining a maximum count number to be counted out by the counter; and the counter counting, set by leading edges of output pulses from the first or the second signal level comparing means and reset by end edges of the same output pulses, counting clock pulses outputted from the clock oscillator, and outputting the first or the second signal defect detection signal when the counter counts out the maximum count number.

5. An apparatus for inspecting a signal-recorded videotape, comprising means for providing first and second predetermined reference voltage:

an amplitude detector for detecting an amplitude of a high frequency signal frequency-modulated with a series of image signal;

a signal level comparing means for comparing an output from the amplitude detector with a predetermined voltage;

a signal duration comparing means for comparing duration of an output from the signal level comparing means with a first predetermined period of time, the signal duration comparing means outputting a first signal defect detection signal for stopping and rejecting a signal-recorded videotape under inspection when the duration of the output from the signal level comparing means is not shorter than the first predetermined period of time;

a Schmitt circuit for generating pulse signals according to a series of audio frequency sound signals inputted thereto;

a period comparing means for comparing time intervals of the pulse signals outputted from the Schmitt circuit with a second predetermined period of time, the period comparing means outputting a second signal defect detection signal for stopping and rejecting a signal-recorded videotape under inspection when a time interval between two successive pulse signals outputted from the Schmitt circuit is not shorter than the second predetermined period of time;

a first monostable multivibrator for generating, triggered by a series of tape speed control pulse signals, a pulse having a width larger than a constant time interval of the tape speed control pulse signals and smaller than twice the constant time interval;

a second monostable multivibrator for generating, triggered by the end edge of a pulse outputted from the first monostable multivibrator, a predetermined pulse;

a first resettable monostable multivibrator having its reset signal input terminal supplied with a signal from the amplitude detector so as to be kept operational only when the amplitude detector continues outputting an amplitude signal, the first resettable monostable multivibrator generating, triggered by the end edge of a pulse outputted from the second monostable multivibrator, a third signal defect detection signal for stopping and rejecting a signal-recorded videotape under inspection;

a third monostable multivibrator for generating, triggered by a series of tape speed control pulse signals, a predetermined pulse; and a second resettable monostable multivibrator having its reset signal input terminal supplied with a signal from the amplitude detector so as to be kept operational only when the amplitude detector continues outputting no amplitude signal in substance, the second resettable monostable multivibrator generating, triggered by the end edge of a pulse outputted from the third monostable multivibrator, a tape end detection signal for stopping and rejecting a signal-recorded videotape under inspection.

6. An apparatus as defined in claim 1 or 5, wherein the period comparing means consist essentially of a combination of a monostable multivibrator with an OR circuit.

7. An apparatus as defined in claim 1 or 6, wherein the period comparing means consists essentially of a counter, a clock oscillator and a count number setting means; the count number setting means determining a maximum count number to be counted out by the counter; and the counter counting, set by end edges of pulse signals outputted from the Schmitt circuit and reset by leading edges of the same pulse signals, counting clock pulses outputted from the clock oscillator, and outputting a signal equivalent to the second signal defect detection signals when the counter counts out the maximum count number.

8. An apparatus as defined in claim 5, wherein the signal duration comparing means consists essentially of a counter, a clock oscillator and a count number setting means; the count number setting means determining a maximum count number to be counted by the counter; and the counter counting, set by leading edges of output pulses from the signal level comparing and reset by end edges of the same output pulses, counting clock pulses outputted from the clock oscillator, and outputting the first signal detection signal when the counter counts out the maximum count number.

9. An apparatus as defined in claim 5, wherein the signal duration comparing means consists essentially of a combination of a monostable multivibrator with an OR circuit.

* * * * *

UNITED STATES PATENT AND TRADEMARK OFFICE
CERTIFICATE OF CORRECTION

PATENT NO. : 5,103,350
DATED : April 7, 1992
INVENTOR(S) : KENJI SATAKE

It is certified that error appears in the above-identified patent and that said Letters Patent is hereby corrected as shown below:

On title page, item [30]

Change "April 7, 1989 [JP]" to --July 4, 1989 [JP]--

Signed and Sealed this

Fifth Day of October, 1993

Attest:

BRUCE LEHMAN

*Attesting Officer*     Commissioner of Patents and Trademarks